United States Patent
Jadhao et al.

(10) Patent No.: US 12,201,065 B2
(45) Date of Patent: Jan. 21, 2025

(54) ROUND BALER IMPLEMENT HAVING FORMING BELT PIN WEAR DETECTION SYSTEM

(71) Applicant: DEERE & COMPANY, Moline, IL (US)

(72) Inventors: Umesh B. Jadhao, Pune (IN); Mohan A. Vadnere, Pune (IN)

(73) Assignee: DEERE & COMPANY, Moline, IL (US)

( * ) Notice: Subject to any disclaimer, the term of this patent is extended or adjusted under 35 U.S.C. 154(b) by 270 days.

(21) Appl. No.: 18/059,110

(22) Filed: Nov. 28, 2022

(65) Prior Publication Data

US 2024/0172597 A1   May 30, 2024

(51) Int. Cl.
*A01F 15/07* (2006.01)
*G06T 7/00* (2017.01)

(52) U.S. Cl.
CPC .............. *A01F 15/07* (2013.01); *G06T 7/001* (2013.01); *A01F 2015/077* (2013.01); *G06T 2207/30164* (2013.01)

(58) Field of Classification Search
CPC ................ A01F 15/07; A01F 2015/077; A01F 2015/078; A01F 15/18; A01F 2015/183; G06T 7/001; G06T 2207/30164
See application file for complete search history.

(56) References Cited

U.S. PATENT DOCUMENTS

| | | | |
|---|---|---|---|
| 5,327,823 A | 7/1994 | Clevenger, Jr. et al. | |
| 5,348,782 A * | 9/1994 | Arnold | A01F 15/07 156/304.3 |
| 5,417,043 A * | 5/1995 | Switzer | A01F 15/07 100/88 |
| 6,164,050 A | 12/2000 | Vande Ryse et al. | |
| 2020/0214219 A1 | 7/2020 | Lebeau et al. | |
| 2021/0366100 A1 | 11/2021 | Rotole et al. | |

FOREIGN PATENT DOCUMENTS

EP    3345474 A1    7/2018

OTHER PUBLICATIONS

Extended European Search Report and Written Opinion issued in European Patent Application No. 23210068.5 dated May 8, 2024, in 05 pages.

\* cited by examiner

*Primary Examiner* — Jimmy T Nguyen

(57) ABSTRACT

A round baler implement includes a forming belt having a first longitudinal end and a second longitudinal end coupled together by a retaining pin to secure the forming belt in an endless loop. An image sensor is positioned and operable to capture an image of the retaining pin. A baler controller receives a current image of the retaining pin from the image sensor and determines a wear condition of the retaining pin therefrom. The baler controller may then communicate a notification signal to a communicator providing the wear condition of the retaining pin, thereby notifying user of the condition of the retaining pin so that the user may decide to replace the retaining pin when necessary.

18 Claims, 3 Drawing Sheets

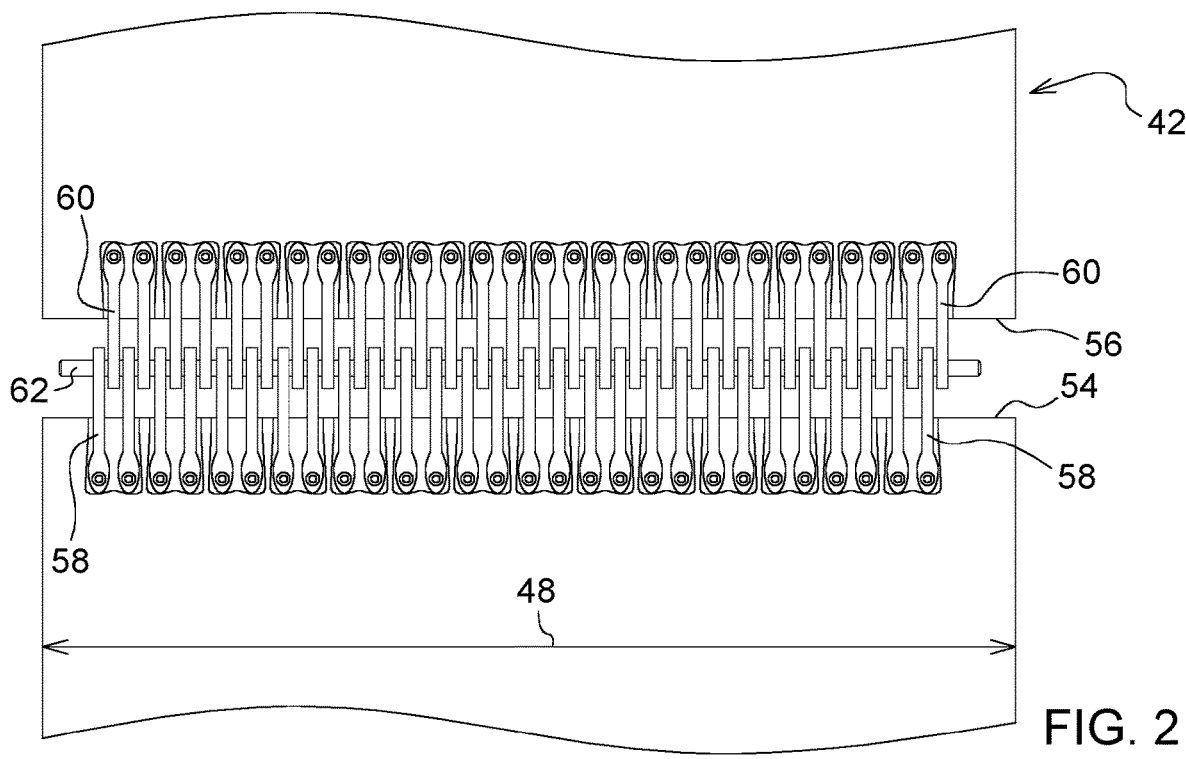
FIG. 2
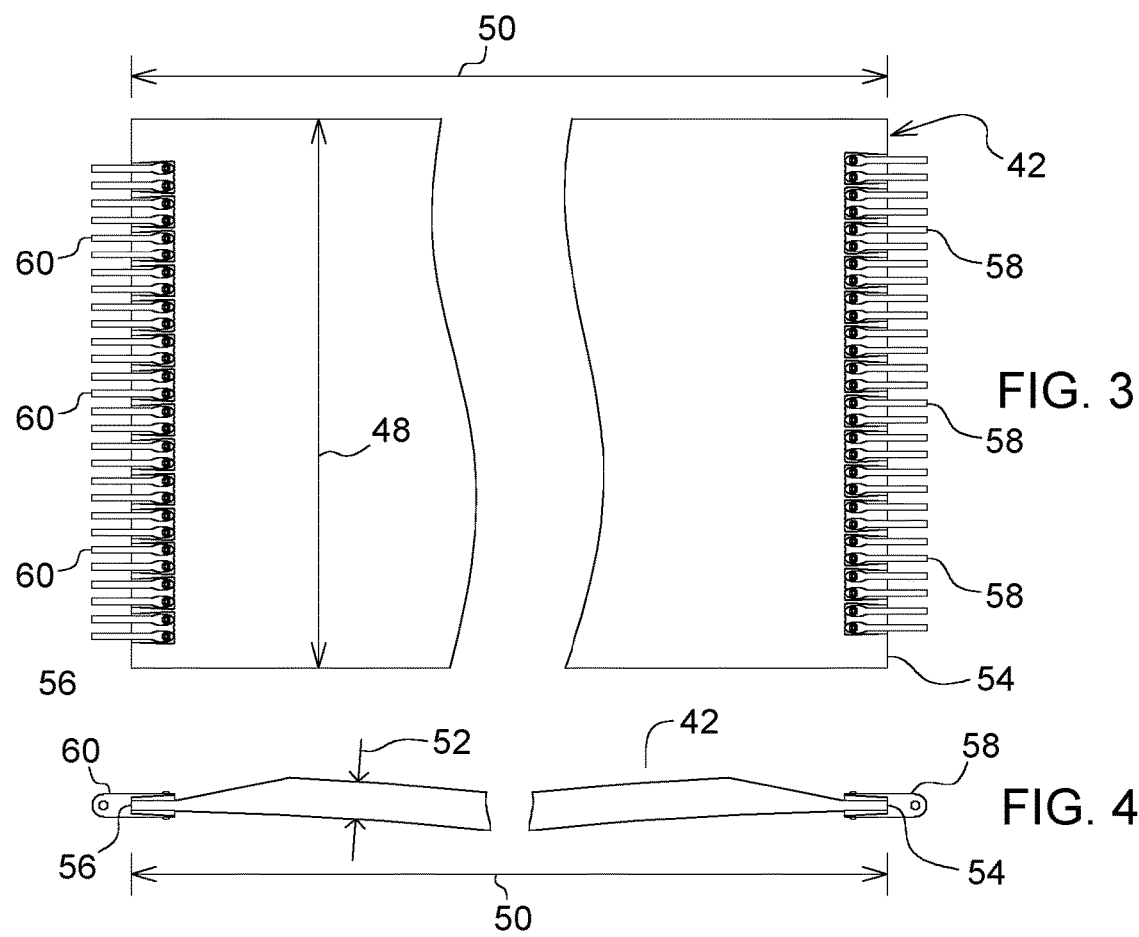
FIG. 3
FIG. 4

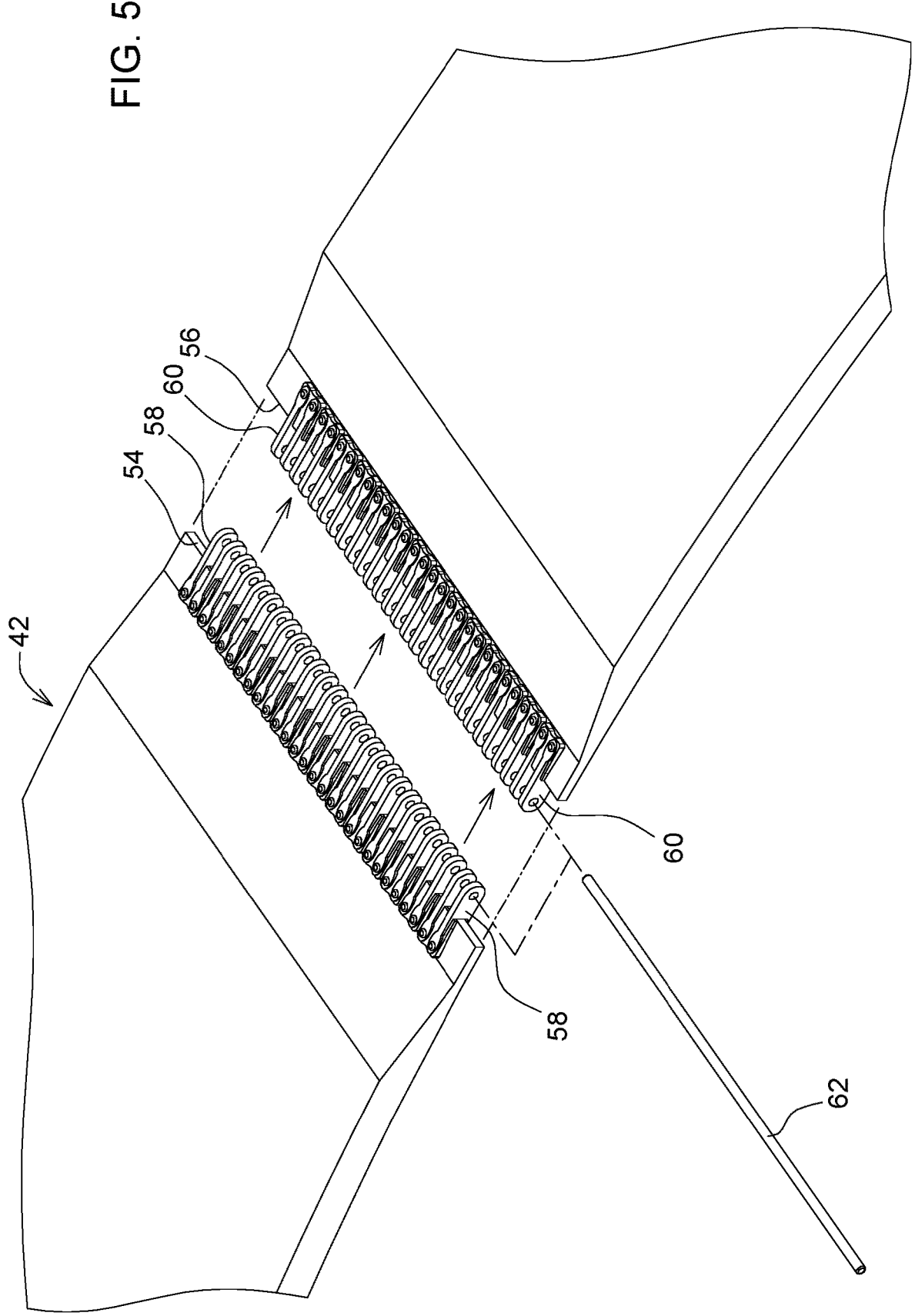

ROUND BALER IMPLEMENT HAVING FORMING BELT PIN WEAR DETECTION SYSTEM

TECHNICAL FIELD

The disclosure generally relates to a round baler implement, and more particularly to a round baler implement having a forming belt pin wear detection system.

BACKGROUND

A round baler implement may be configured as a variable chamber baler, or as a fixed chamber baler. When configured as a variable chamber baler, the round baler implement includes a plurality of longitudinally extending side-by-side forming belts that are supported by a plurality of rollers. The bale is formed by the forming belts and one or more side walls. Crop material is directed through an inlet and into a baling chamber, whereby the forming belts roll the crop material in a spiral fashion into the bale having a cylindrical shape. The belts apply a constant pressure to the crop material as the crop material is formed into the bale. A belt tensioner continuously moves the forming belts radially outward relative to a center of the cylindrical bale as the diameter of the bale increases. The belt tensioner maintains the appropriate tension in the belts to obtain the desired density of the crop material.

Each of the forming belts is manufactured from a flexible material and includes a generally flat body having a transverse width, a longitudinal length, and a thickness. The body of each respective forming belt extends along the longitudinal length between a first end and a second end. A retaining pin interconnects the first end and the second end of the respective forming belt to form an endless loop. The retaining pin is a wear item that requires replacement after a period of us. With excessive wear, the retaining pin may develop ridges and/or grooves, which make it difficult to remove the retaining pin and thereby increase the time required for replacement. Failure to replace the retaining pin may result in the retaining pin breaking, causing downtime for the round baler implement and also increasing the difficulty in replacing the retaining pin. It is therefore desirable to replace the retaining pin before the retaining pin develops deep ridges and/or grooves from excessive wear and/or breaks.

SUMMARY

A round baler implement is provided. The round baler implement includes a housing and a plurality of rollers rotatably supported by the housing. A forming belt is supported by the plurality of rollers. The forming belt is movable in a continuous circuit about the plurality of rollers. The forming belt includes a first longitudinal end and a second longitudinal end disposed opposite the first longitudinal end along a longitudinal extent of the forming belt. A retaining pin interconnects the first longitudinal end and the second longitudinal end together to secure the forming belt in an endless loop. An image sensor is positioned and operable to capture an image of the retaining pin. A baler controller is disposed in communication with the image sensor. The baler controller includes a processor and a memory having a pin monitoring algorithm stored therein. The processor is operable to execute the pin monitoring algorithm to receive a current image of the retaining pin from the image sensor. The baler controller may then determine a wear condition of the retaining pin from the received current image of the retaining pin, and communicate a notification signal to a communicator. The notification signal includes the wear condition of the retaining pin, thereby notifying user of the condition of the retaining pin so that the user may decide to replace the retaining pin when necessary.

In one aspect of the disclosure, the image sensor may include one of, but is not limited to, a camera, an infrared sensor, or a near infrared sensor. In one implementation, the image sensor may include a high speed camera capable of capturing an image of the retaining pin while the retaining pin is in motion.

In one aspect of the disclosure, the processor may be operable to execute the pin monitoring algorithm to compare the current image to each of a plurality of representative wear images to determine which one of the plurality of representative wear images the current image most closely resembles. Each of the plurality of representative wear images may correspond to a different wear condition. The wear condition may indicate a deviation of the retaining pin from an initial structural condition. The wear condition may include, but is not limited to, a percentage of wear, a remaining life expectancy, etc. The one of the plurality of representative wear images most closely resembling the retaining pin in the current image may then identify the wear condition, i.e., the percentage of wear, remaining life expectancy, etc.

In one aspect of the disclosure, the notification signal may include a recommendation to replace the retaining pin when the wear condition is below a threshold. The threshold may be defined based on a desired condition for replacement. When the wear condition falls below the desired condition for replacement, the notification signal may include the recommendation to replace the retaining pin along with the notification of the current wear condition.

In one aspect of the disclosure, the processor may be operable to execute the pin monitoring algorithm to track a total number of bales completed with the retaining pin. The baler controller may then capture the current image after completion of a first number of bales. The first number of bales may be defined to include any number of bales. For example, the first number of bales may be defined to include, but is not limited to, one hundred bales. The baler controller may repeat the monitoring process after the completion of each subsequent bale completion interval.

In one aspect of the disclosure, the processor may be operable to execute the pin monitoring algorithm to track a total number of bales completed with the retaining pin. The baler controller may communicate a maintenance request signal to the communicator after completion of a second number of bales. The second number of bales may be defined to include any number of bales. For example, the second number of bales may be defined to include, but is not limited to, one thousand bales. The maintenance request signal may include a notification recommending replacement of the retaining pin.

Accordingly, the round baler implement described herein automatically monitors and notifies an operator of the wear condition of the retaining pin, thereby keeping the operator informed of the status of the retaining pin and enabling the operator to schedule replacement of the retaining pin at a desirable time and condition, prior to the retaining pin becoming excessively worn and/or breaking.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic fragmentary plan view of a forming belt.

FIG. 3 is a schematic plan view of the forming belt laid flat.

FIG. 4 is a schematic side view of the forming belt laid flat.

FIG. 5 is a schematic perspective exploded view of the forming belt.

DETAILED DESCRIPTION

Figure 1:
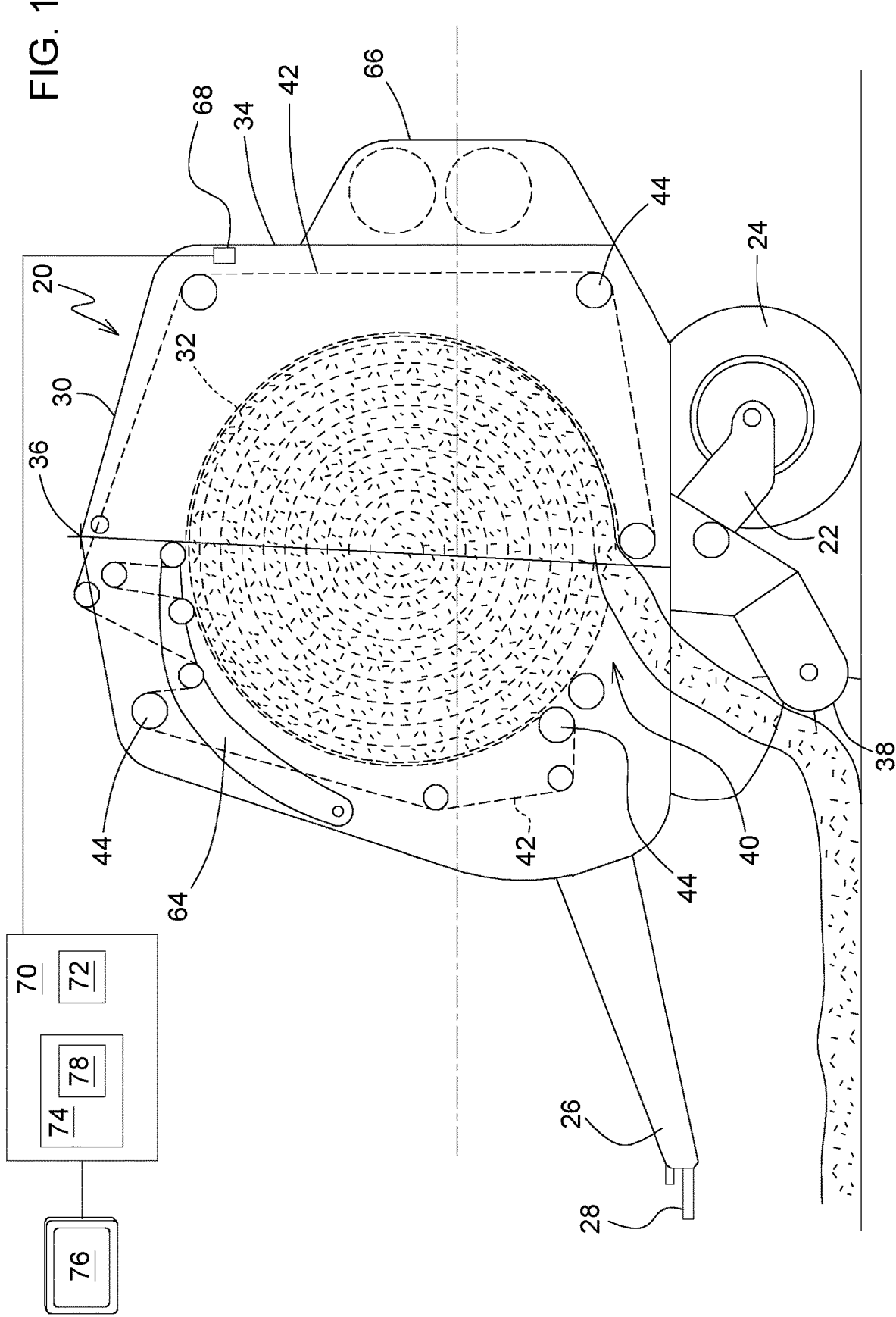
FIG. 1 is a schematic side view of a round baler implement.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a round baler implement is generally shown at 20 in FIG. 1. Referring to FIG. 1, the round baler implement 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement 28 may be included with the tongue 26.

The hitch arrangement 28 may be used to attach the round baler implement 20 to a traction unit, such as but not limited to an agricultural tractor. In other embodiments, the round baler implement 20 may be self-propelled, in which case the traction unit and the round baler implement 20 are configured as a single, self-propelled vehicle.

The round baler implement 20 includes a housing 30 forming a baling chamber 32. The housing 30 is attached to and supported by the frame 22. The housing 30 may include one or more walls or panels that at least partially enclose and/or define the baling chamber 32. The round baler implement 20 further includes a gate 34. The gate 34 is attached to and rotatably supported by the housing 30. The gate 34 is positioned adjacent a rearward end of the frame 22 and is pivotally moveable about a gate axis 36. The gate axis 36 is generally horizontal and perpendicular to a central longitudinal axis of the frame 22. The gate 34 is moveable between a closed position for forming a bale within the baling chamber 32, and an open position for discharging the bale from the baling chamber 32.

The round baler implement 20 includes a pick-up 38 disposed proximate the forward end of the frame 22. The pick-up 38 gathers crop material from a ground surface and directs the gathered crop material toward and into an inlet 40 of the baling chamber 32. The pick-up 38 may include, but is not limited to tines, forks, augers, conveyors, baffles, etc., for gathering and moving the crop material. The round baler implement 20 may be equipped with a pre-cutter, disposed between the pick-up 38 and the inlet 40. As such, the pre-cutter is disposed downstream of the pick-up 38 and upstream of the inlet 40 relative to a direction of travel of the crop material. The pre-cutter cuts or chops the crop material into smaller pieces.

The round baler implement 20 shown in the Figures and described herein is depicted and described as a variable chamber baler. As is understood by those skilled in the art, the variable chamber baler includes a plurality of longitudinally extending side-by-side forming belts 42 that are supported by a plurality of rollers 44. The bale is formed by the forming belts 42 and one or more side walls of the housing 30. The plurality of rollers 44 are each rotatably supported by the housing 30. At least one of the rollers 44 is driven to rotate the forming belts 42 in a circuitous path about the plurality of rollers 44.

Referring to FIGS. 2 through 5, each of the forming belts 42 is manufactured from a flexible material, such as but not limited to a rubber or rubberlike material. Each of the forming belts 42 includes a generally flat body 46 having a transverse width 48, a longitudinal length 50, and a thickness 52. The body 46 of each respective forming belt extends along the longitudinal length 50 between a first longitudinal end 54 and a second longitudinal end 56. The first longitudinal end 54 includes a plurality of first end clevises 58 aligned across the transverse width 48 of the first longitudinal end 54. Similarly, the second longitudinal end 56 includes a plurality of second end clevises 60 aligned across the transverse width 48 of the second longitudinal end 56. A retaining pin 62 interconnects the first end and the second end of the respective forming belt to secure the respective forming belt in an endless loop. More particularly, the retaining pin 62 passes through each of the plurality of first end clevises 58 and the plurality of second end clevises 60 to connect the first longitudinal end 54 and the second longitudinal end 56.

Referring to FIG. 1, the crop material is directed through the inlet 40 and into the baling chamber 32, whereby the forming belts 42 roll the crop material in a spiral fashion into the bale having a cylindrical shape. The bells apply a constant pressure to the crop material as the crop material is formed into the bale. A belt tensioner 64 continuously moves the forming belts 42 radially outward relative to a center of the cylindrical bale as the diameter of the bale increases. The belt tensioner 64 maintains the appropriate tension in the belts to obtain the desired density of the crop material.

The round baler implement 20 includes a wrap system 66. The wrap system 66 is operable to wrap the bale with a wrap material inside the baling chamber 32. Once the bale is formed to a desired size, the wrap system 66 feeds the wrap material into the baling chamber 32 to wrap the bale and thereby secure the crop material in a tight package and maintain the desired shape of the bale. The wrap material may include, but is not limited to, a twine, a net mesh, or a solid plastic wrap. Movement of the gate 34 into the open position simultaneously moves the belts clear of the formed bale, and allows the formed and wrapped bale to be discharged through the rear of the baling chamber 32.

As shown in FIG. 1, the round baler implement 20 further includes an image sensor 68. The image sensor 68 is positioned and operable to capture an image of the retaining pin 62. The image sensor 68 may be positioned, for example, within an interior of the housing 30 at a location near the path of the forming belt, whereby the retaining pin 62 passes in its circuitous path around the rollers 44. In other implementations, the image sensor 68 may be positioned, for example, on an exterior surface of the housing 30 adjacent a window providing viewing access to the forming belt. It should be appreciated that the image sensor 68 may be positioned at other locations on the round baler implement 20 not described herein.

The image sensor 68 may include, but is not limited to, one of a camera, an infrared sensor, or a near infrared sensor, etc. In one implementation, the image sensor 68 may include a high speed camera capable of capturing an image of the retaining pin 62 while the retaining pin 62 is in motion. However, in other implementations, the image sensor 68 may include a camera configured for capturing an image of the retaining pin 62 while stationary. The image sensor 68 may include a device capable of capturing an image of the retaining pin 62 with sufficient clarity for object recognition and comparison analysis, described in greater detail below.

The baler controller 70 is disposed in communication with the image sensor 68. The baler controller 70 is operable to receive image signals from the image sensor 68, and communicate a signal to a communicator 76. While the baler controller 70 is generally described herein as a singular device, it should be appreciated that the baler controller 70 may include multiple devices linked together to share and/or communicate information therebetween. Furthermore, it should be appreciated that the baler controller 70 may be located on the round baler implement 20 or located remotely from the round baler implement 20, such as on an associated tow vehicle, e.g., a tractor or other similar vehicle.

The baler controller 70 may alternatively be referred to as a computing device, a computer, a controller, a control unit, a control module, a module, etc. The baler controller 70 includes a processor 72, a memory 74, and all software, hardware, algorithms, connections, sensors, etc., necessary to manage and control the operation of the image sensor 68. As such, a method may be embodied as a program or algorithm operable on the baler controller 70. It should be appreciated that the baler controller 70 may include any device capable of analyzing data from various sensors, comparing data, making decisions, and executing the required tasks.

As used herein, "baler controller 70" is intended to be used consistent with how the term is used by a person of skill in the art, and refers to a computing component with processing, memory, and communication capabilities, which is utilized to execute instructions (i.e., stored on the memory 74 or received via the communication capabilities) to control or communicate with one or more other components. In certain embodiments, the baler controller 70 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler controller 70 may be in communication with other components on the round baler implement 20, such as hydraulic components, electrical components, and operator inputs within an operator station of an associated work vehicle. The baler controller 70 may be electrically connected to these other components by a wiring harness such that messages, commands, and electrical power may be transmitted between the baler controller 70 and the other components. Although the baler controller 70 is referenced in the singular, in alternative embodiments the configuration and functionality described herein can be split across multiple devices using techniques known to a person of ordinary skill in the art.

The baler controller 70 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 74 may include any non-transitory/tangible medium which participates in providing data or computer-readable instructions. The memory 74 may be non-volatile or volatile. Non-volatile media may include, for example, optical or magnetic disks and other persistent memory. Example volatile media may include dynamic random access memory (DRAM), which may constitute a main memory. Other examples of embodiments for memory 74 include a floppy, flexible disk, or hard disk, magnetic tape or other magnetic medium, a CD-ROM, DVD, and/or any other optical medium, as well as other possible memory devices such as flash memory.

The baler controller 70 includes the tangible, non-transitory memory 74 on which are recorded computer-executable instructions, including a pin monitoring algorithm 78. The processor 72 of the baler controller 70 is configured for executing the pin monitoring algorithm 78. The pin monitoring algorithm 78 implements a method of monitoring the condition of the retaining pin 62, described in detail below.

In one implementation of the disclosure, the processor 72 is operable to execute the pin monitoring algorithm 78 to track a total number of bales completed with the retaining pin 62. In order to do so, the baler controller 70 may be configured to receive an installation date input, providing the date the retaining pin 62 was installed. The baler controller 70 may then log the total number of bales produced with the round bale implement since the installation date, thereby tracking the total number of bales completed with the retaining pin 62.

The baler controller 70 may then capture a current image of the retaining pin 62 after completion of a first number of bales. The baler controller 70 receives the current image of the retaining pin 62 from the image sensor 68. The first number of bales may be defined to include any number of bales suitable for a monitoring sequence or frequency. For example, the first number of bales may be defined to equal one hundred completed bales, one hundred fifty completed bales, two hundred completed bales, etc. The process described below may be repeated after the subsequent completion of the first number of bales as well. For example, if the first number of bales is defined to equal one hundred bales, then the baler controller 70 may capture an image of the retaining pin 62 after one hundred bales have been completed after the installation date of the retaining pin 62. Additionally, the baler controller 70 may capture subsequent images of the retaining pin 62 after two hundred bales have been completed after the installation date of the retaining pin 62, again after three hundred bales have been completed after the installation date of the retaining pin 62, etc. In so doing, the baler controller 70 may capture an image of the retaining pin 62 after the completion of every one hundred bales. As noted above, the first number of bales may be defined to include a different number, thereby changing the frequency subsequent images may be captured of the retaining pin 62.

In one implementation, the image sensor 68 may be configured as a high speed camera capable of capturing the current image of the retaining pin 62 while the forming belt is moving about the rollers 44. Accordingly, the current image of the retaining pin 62 may be captured during operation of the round baler implement 20. In another implementation, the baler controller 70 may control movement of the forming belt to position the retaining pin 62 in a desired location relative to the image sensor 68, whereafter the baler controller 70 stops movement of the forming belt so that the retaining pin 62 comes to rest in the desired position within the field of view of the image sensor 68. The image sensor 68 may then capture the current image of the retaining pin 62 with the forming belt at rest.

The baler controller 70 may then analyze the current image of the retaining pin 62 to determine a wear condition of the retaining pin 62. The wear condition indicates a deviation of the retaining pin 62 from an initial structural condition. The wear condition may include, but is not limited to, a percentage of wear, a remaining life expectancy, etc. The one of the plurality of representative wear images most closely resembling the retaining pin 62 in the current image may then identify the wear condition, i.e., the percentage of wear, remaining life expectancy, etc.

In one implementation of the disclosure, the baler controller 70 may compare the current image of the retaining pin 62 to each of a plurality of representative wear images to determine which one of the plurality of representative wear images the current image most closely resembles. Each of the plurality of representative wear images may correspond to a different wear condition. The wear condition may indicate a deviation of the retaining pin 62 from the initial structural condition. The wear condition may include, but is not limited to, a percentage of wear, a remaining life expectancy, etc. The one of the representative wear images of the retaining pin 62 that most closely resembles the retaining pin 62 in the current image may be used to identify the wear condition, i.e., the percentage of wear, remaining life expectancy, etc. In other words, the wear condition associated with the particular representative wear image of the retaining pin 62 that most closely resembles the retaining pin 62 in the current image of the retaining pin 62 may define the current wear condition of the retaining pin 62. The baler controller 70 may use, but is not limited to, object and shape detection and analysis algorithms understood by those skilled in the art to analyze the current image of the retaining pin 62 and compare the current image of the retaining pin 62 to the representative wear images of the retaining pin 62.

The baler controller 70 may then communicate a notification signal to the communicator 76. The communicator 76 may include a device that is capable of conveying or communicating a message. For example, the communicator 76 may include, but is not limited to, a visual display device such as but not limited to a touch screen display or the like, an audio device such as but not limited to a speaker. In other implementations, the communicator 76 may include another computing device located remotely from the round baler implement 20 capable of receiving the notification signal and saving the notification signal in a data file. It should be appreciated that the communicator 76 may vary from the example implementations described herein.

The notification signal includes or indicates the wear condition of the retaining pin 62. The notification signal may generate a visual communication on the communicator 76, such as a visual display, indicating the wear condition. For example, the notification signal may generate a message stating, describing, or otherwise showing the wear condition. In some implementations, the notification signal may further include the current image of the retaining pin 62.

The baler controller 70 may further compare the wear condition of the retaining pin 62 to a threshold. The threshold may be defined to include a desired condition of the retaining pin 62 at which replacement is desirable. A wear condition below the threshold may indicate replacement of the retaining pin 62 is desirable, whereas a wear condition above the threshold may indicate that the retaining pin 62 is not yet ready for replacement and is suitable for continued operation. When the wear condition is below the threshold, the notification signal may further include a recommendation to replace the retaining pin 62.

In addition to recommending replacement of the retaining pin 62 based on the wear condition of the retaining pin 62 determined via the comparison of the current image of the retaining pin 62 and the representative wear images of the retaining pin 62, the baler controller 70 may further communicate a maintenance request signal to the communicator 76 after completion of a second number of bales. The second number of bales may be based on empirical data generated via testing that indicates a common or typical number of bales associated with defined level or amount of wear in the retaining pin 62s. The second number of bales may further be dependent upon other factors, such as crop type, moisture conditions, ash content, etc.

As described above, the baler controller 70 may track the total number of bales completed since the installation date of the retaining pin 62. Upon the round baler implement 20 completing the second number of bales, the baler controller 70 may communicate the maintenance request signal to the communicator 76. The maintenance request signal may include a recommendation to replace the retaining pin 62.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A round baler implement comprising:
   a housing;

a plurality of rollers rotatably supported by the housing;
a forming belt supported by the plurality of rollers and movable in a continuous circuit about the plurality of rollers;
wherein the forming belt includes a first longitudinal end, a second longitudinal end disposed opposite the first longitudinal end along a longitudinal extent of the forming belt, and a retaining pin interconnecting the first longitudinal end and the second longitudinal end together to secure the forming belt in an endless loop;
an image sensor positioned and operable to capture an image of the retaining pin;
a baler controller disposed in communication with the image sensor, wherein the baler controller includes a processor and a memory having a pin monitoring algorithm stored therein, wherein the processor is configured to execute the pin monitoring algorithm to:
receive a current image of the retaining pin from the image sensor;
determine a wear condition of the retaining pin from the received current image of the retaining pin; and
communicate a notification signal to a communicator, wherein the notification signal includes the wear condition of the retaining pin.

2. The round baler implement set forth in claim 1, wherein the image sensor includes a high speed camera capable of capturing an image of the retaining pin while the retaining pin is in motion.

3. The round baler implement set forth in claim 1, wherein the processor is operable to execute the pin monitoring algorithm to compare the current image to each of a plurality of representative wear images to determine which one of the plurality of representative wear images the current image most closely resembles, wherein each of the plurality of representative wear images corresponds to a different wear condition.

4. The round baler implement set forth in claim 1, wherein the processor is operable to execute the pin monitoring algorithm to track a total number of bales completed with the retaining pin.

5. The round baler implement set forth in claim 4, wherein the processor is operable to execute the pin monitoring algorithm to capture the current image after completion of a first number of bales.

6. The round baler implement set forth in claim 4, wherein the processor is operable to execute the pin monitoring algorithm to communicate a maintenance request signal to the communicator after completion of a second number of bales, wherein the maintenance request signal includes a notification recommending replacement of the retaining pin.

7. The round baler implement set forth in claim 1, wherein the wear condition indicates a deviation of the retaining pin from an initial structural condition.

8. The round baler implement set forth in claim 1, wherein the notification signal includes a recommendation to replace the retaining pin when the wear condition is below a threshold.

9. The round baler implement set forth in claim 1, wherein the image sensor includes one of a camera, an infrared sensor, or a near infrared sensor.

10. A round baler implement comprising:
a housing;
a plurality of rollers rotatably supported by the housing;
a forming belt supported by the plurality of rollers and movable in a continuous circuit about the plurality of rollers;
wherein the forming belt includes a first longitudinal end, a second longitudinal end disposed opposite the first longitudinal end along a longitudinal extent of the forming belt, and a retaining pin interconnecting the first longitudinal end and the second longitudinal end together to secure the forming belt in an endless loop;
an image sensor operably connected to the retaining pin
a baler controller including a processor and a memory having a pin monitoring algorithm stored therein, wherein the processor is configured to execute the pin monitoring algorithm to:
track a total number of bales completed with the retaining pin; and
communicate a maintenance request signal to a communicator after completion of a pre-defined number of bales, wherein the maintenance request signal includes a notification recommending replacement of the retaining pin.

11. The round baler implement set forth in claim 10, wherein the image sensor positioned and operable to capture an image of the retaining pin.

12. The round baler implement set forth in claim 11, wherein the processor is operable to execute the pin monitoring algorithm to:
receive a current image of the retaining pin from the image sensor;
determine a wear condition of the retaining pin from the received current image of the retaining pin; and
communicate a notification signal to the communicator, wherein the notification signal includes the wear condition of the retaining pin.

13. The round baler implement set forth in claim 11, wherein the image sensor includes a high speed camera capable of capturing an image of the retaining pin while the retaining pin is in motion.

14. The round baler implement set forth in claim 11, wherein the image sensor includes one of a camera, an infrared sensor, or a near infrared sensor.

15. The round baler implement set forth in claim 12, wherein the processor is operable to execute the pin monitoring algorithm to compare the current image to each of a plurality of representative wear images to determine which one of the plurality of representative wear images the current image most closely resembles, wherein each of the plurality of representative wear images corresponds to a different wear condition.

16. The round baler implement set forth in claim 12, wherein the processor is operable to execute the pin monitoring algorithm to capture the current image after completion of a first number of bales.

17. The round baler implement set forth in claim 12, wherein the wear condition indicates a deviation of the retaining pin from an initial structural condition.

18. The round baler implement set forth in claim 12, wherein the notification signal includes a recommendation to replace the retaining pin when the wear condition is below a threshold.

* * * * *